United States Patent [19]

Chenevey et al.

[11] Patent Number: 4,898,924
[45] Date of Patent: Feb. 6, 1990

[54] PROCESS FOR THE PRODUCTION OF BIAXIALLY ORIENTED RIGID ROD HETEROCYCLIC LIQUID CRYSTALLINE POLYMER FILMS

[75] Inventors: Edward C. Chenevey, North Plainfield; Edward R. Kafchinski, Winfield, both of N.J.

[73] Assignee: Hoechst Celanese Corporation, Somerville, N.J.

[21] Appl. No.: 295,689

[22] Filed: Jan. 11, 1989

[51] Int. Cl.$^4$ .............. B29C 55/12; B29C 55/28; C08G 73/22; C08G 75/32

[52] U.S. Cl. .................... 528/183; 264/184; 264/209.5; 264/233; 264/235.8; 264/290.2; 264/331.12; 264/557; 264/558; 264/559; 264/560; 264/561; 528/337

[58] Field of Search ................. 264/184, 209.1, 209.5, 264/233, 235.8, 290.2, 331.12, 557, 558, 559, 560, 561; 525/425; 528/183, 185, 337, 377

[56] References Cited

U.S. PATENT DOCUMENTS

| | | | |
|---|---|---|---|
| 3,313,783 | 4/1967 | Iwakura et al. | 528/337 X |
| 3,574,170 | 4/1971 | Chenevey | 528/183 X |
| 4,051,108 | 9/1977 | Helminiak et al. | 528/337 X |
| 4,054,633 | 10/1977 | Richardson | 264/184 |
| 4,108,835 | 8/1978 | Arnold et al. | 528/183 |
| 4,131,748 | 12/1978 | Arnold et al. | 528/183 X |
| 4,225,700 | 9/1980 | Wolfe et al. | 528/337 |
| 4,359,567 | 11/1982 | Evers | 528/185 X |
| 4,377,546 | 3/1983 | Helminiak et al. | 264/331.12 X |
| 4,423,202 | 12/1983 | Choe | 528/183 X |
| 4,487,735 | 12/1984 | Chenevey et al. | 264/184 X |
| 4,554,119 | 11/1985 | Chenevey | 264/184 X |
| 4,606,875 | 8/1986 | Chenevey et al. | 264/184 X |

Primary Examiner—Jeffery Thurlow
Assistant Examiner—Leo B. Tentoni
Attorney, Agent, or Firm—Burns, Doane, Swecker & Mathis

[57] ABSTRACT

A process is disclosed for the production of biaxially oriented liquid crystal films. The process includes:
(i) forming an anisotropic dope from a polymerization solution of rigid rod heterocyclic liquid crystalline polymers such as poly{[benzo(1,2-d:4,5-d')bisthiazole-2,6-diyl] 1,4-phenylene}, its cis isomer or mixtures thereof, and poly{[benzo(1,2-d:4,5-d')bisoxazole-2,6-diyl] 1,4-phenylene}, its cis isomer or mixtures thereof, and a solvent such as polyphosphoric acid;
(ii) extruding the dope to form a film;
(iii) imparting biaxial orientation to the film to increase the transverse strength thereof;
(iv) solidifying the biaxially oriented film; and
(v) washing the solidified film to remove the solvent.
Also disclosed is a liquid crystal film produced by the above process.

26 Claims, 1 Drawing Sheet

PROCESS FOR THE PRODUCTION OF BIAXIALLY ORIENTED RIGID ROD HETEROCYCLIC LIQUID CRYSTALLINE POLYMER FILMS

This invention was made with Government support under Contract No. F33615-83-C-5093 awarded by the Department of Defense (DOD). The Government has certain rights in this invention.

BACKGROUND OF THE INVENTION

1. Field of the Invention

The present invention relates to a process for preparing film of rigid rod heterocyclic liquid crystalline polymers. Such polymers include, for example, poly{[benzo(1,2- d:4,5-d')bisthiazole-2,6-diyl]1,4-phenylene}, its cis isomer or mixtures thereof (all hereinafter referred to as "PBZT"), and poly{[benzo(1,2-d:4,5-d')bisoxazole-2,6-diyl]1,4-phenylene}, its cis isomer or mixtures thereof (all hereinafter referred to as "PBO").

2. Description of the Prior Art

In the past, PBZT dope has been extruded and stretched in the uniaxial direction to produce strong, stiff, highly oriented ribbons upon coagulation. Unfortunately, these ribbons have been found to lack transverse strength due to the ordering of the structure which results in splitting upon handling. This would not present a substantial problem if the ribbons were merely used as filament wound structures. However, under certain circumstances it would be desirable to sacrifice some machine direction properties to achieve improved cross-machine strength and thus handleability.

One process for preparing films of PBZT having uniaxial orientation is described in U.S. Pat. No. 4,487,735. In that process, a solution of PBZT is formed and a film of the solution is extruded on a casting roll which rotates at a surface speed which is greater than the extrusion speed to yield a certain stretch. The film is then washed and heat treated.

There is also a method known in the art for preparing shaped articles of rigid rod heterocyclic liquid crystalline polymers having uniaxial orientation which is disclosed in U.S. Pat. No. 4,606,875. In that method, a reaction mixture containing e.g., PBZT or PBO is formed and the mixture polymerized to form a polymer solution from which shaped articles are directly formed.

Films have been blown from thermoplastic melts to generate biaxial properties. Generally, a melt of thermoplastic polymeric material is extruded upward through a tubular die pressurized with air thus expanding the molten tube of material. A blast of air is then used to solidify the melt. The resulting tube is collapsed with the aid of guide bars by a set of nip rolls which flatten the tube and confine the bubble between the nip rolls and the de face. The edges are then slit from the tube and the resulting two films are wound. These methods, however, have been considered useful only with thermoplastic polymer melts, due to their high viscosities and solids content. Unlike thermoplastic melts, blow films from polymer solutions have not been considered to be practical. That is, solvent evaporation during blowing of a solution would be expected to harden the surface thus inhibiting expansion and causing cracking. Also, normal solutions were not thought to be suitable for the stress necessary to develop orientation, whether uniaxial or biaxial.

OBJECTS AND SUMMARY OF THE INVENTION

Accordingly, it is a general object of the present invention to provide a novel process for preparing rigid rod heterocyclic liquid crystalline polymer film.

It is another object of the invention to provide a process which will produce a film of a rigid rod heterocyclic liquid crystalline polymer having not only good uniaxial properties but also good biaxial properties thereby enhancing the transverse strength of the film.

It is a further object of the present invention to provide a process which will produce a film of a rigid rod heterocyclic liquid crystalline polymer having enhanced transverse strength from a solution.

It is even another object of the present invention to provide a novel film of a rigid rod heterocyclic liquid crystalline polymer having good uniaxial properties as well as good biaxial properties.

Therefore, the present invention provides a process for preparing a biaxially oriented rigid rod heterocyclic liquid crystalline polymer film. The process comprises:

(i) forming an anisotropic dope from a polymerization solution of a high molecular weight rigid rod heterocyclic liquid crystalline polymer and a solvent;

(ii) extruding the dope to form a film;

(iii) imparting biaxial orientation to the film to increase the transverse strength thereof;

(iv) solidifying the biaxially oriented film; and (v) washing the solidified film to remove the solvent.

In another aspect of the invention, the resulting film is heat treated at elevated temperatures to further enhance the properties of the film.

DETAILED DESCRIPTION OF THE PREFERRED EMBODIMENTS

Figure 1:
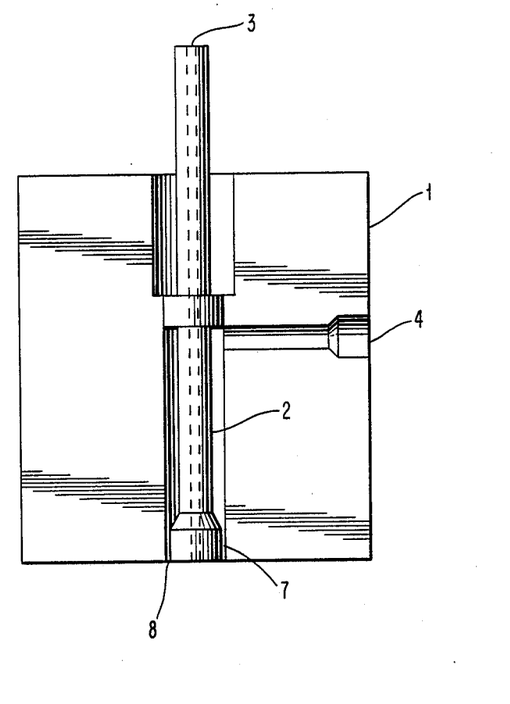
The FIGURE is a schematic view of one example of an apparatus which is useful for blowing a film of rigid rod heterocyclic liquid crystalline polymer according to the present invention.

As stated hereinabove, one aspect of the present invention relates to a process for preparing a biaxially oriented liquid crystal polymer film wherein a rigid rod heterocyclic liquid crystalline polymer dope of a solution of the polymer and a solvent is extruded to form a film. The film is then treated to impart biaxial orientation to the film, thus increasing the transverse strength thereof. The expanded film is then solidified followed by washing to remove the solvent.

PBZT and PBO are the preferred rigid rod heterocyclic liquid crystalline polymers to be used in the present invention. Of these, PBZT is the most preferred. Therefore, for purposes of brevity and conciseness, the invention will be described below in terms of the preferred embodiment, namely the embodiment which is directed to the preparation of a biaxially oriented PBZT liquid crystalline polymer film. It will be understood, however, that the following description is not intended to limit the invention to that embodiment.

PBZT is a rigid rod heterocyclic polymer which exhibits liquid crystalline (i.e., anisotropic) properties when in solution. The polymer has the repeating unit:

and/or

Of course, as should be understood by those of ordinary skill in the art, the available hydrogen atoms on the aromatic rings may be substituted with halogen atoms and short chain alkyl and alkoxy groups which do not substantially adversely affect the characteristics of the polymer. The formal name, the designation "PBZT" as well as the illustrated recurring units are to be understood as encompassing such polymers.

To prepare the film of a rigid rod heterocyclic liquid crystalline polymer such as PBZT in accordance with the present invention, a solution or dope of the polymer is initially obtained. The polymer may be obtained by preparing the polymer using techniques known to those skilled in the art. Such techniques are exemplified in the disclosures of U.S. Pat. Nos. 3,574,170 and 4,225,700, the contents of which are incorporated by reference. The polymer may be formed in a suitable solvent such as polyphosphoric acid and used as is or alternatively, the formed polymer may be recovered by precipitation, washed free of solvent, dried, and then redissolved in another suitable solvent such as sulfuric acid, methane sulfonic acid, chlorosulfonic acid, etc. Of these choices, fabrication of the polyphosphoric acid polymerization mixture is preferred. The solution typically comprises from about 2 to about 18% by weight of PBZT, preferably about 10 to about 18%, and most preferably 12 to about 16% by weight of PBZT.

Alternatively, the polymer solution may be formed by polymerizing the reactants for PBZT in a reaction mixture and then directly extruding the film therefrom. More particularly, the reaction mixture is comprised of 2,5-diamino-1,4-benzenedithiol dihydrochloride and/or 2,4-diamino-1,5-benzenedithiol and terephthalic acid in about equimolar amounts which are dissolved in a reaction medium of, for example, polyphosphoric acid. Such reaction mediums are available commercially or may be synthesized. In the instance of polyphosphoric acid, this may be achieved by adding phosphorus pentoxide to orthophosphoric acid and heating the mixture. A more complete discussion of this procedure is set forth in U.S. Pat. No. 3,313,783, the contents of which are incorporated by reference.

Polymerization of the reactants is typically undertaken at a temperature in the range of from about 150° C. to about 220° C., preferably from about 170° C. to about 200° C., and at approximately atmospheric pressure, preferably from about 720 to 800 mm.Hg. Although the process may be conducted under atmospheric conditions, the reaction is preferably conducted in the substantial absence of oxygen. That is, the reaction is preferably conducted in an atmosphere selected from the group consisting of nitrogen, helium, argon, neon, krypton, carbon dioxide and mixtures thereof with nitrogen being preferred. It will be understood that the reaction time to obtain substantially complete polymerization will vary depending on the reaction conditions. However, the reaction will typically require from about 6 to about 24 hours. Sufficient stirring of the reaction may be necessary to ensure dissolution and an intimate uniform mixture.

The resulting PBZT dope is preferably a high molecular weight anisotropic dope. In particular, the dope is an anisotropic dope, which is a solution, but which behaves in a manner similar to rubbery solids rather than a normal solution. As a result, the dope can be advantageously processed using melt processing techniques rather than solution processing techniques due to the high viscosity of the dope. In this regard, the intrinsic viscosity ("IV") of the dope should range from about 10 to about 35, preferably about 14 to about 30, and most preferably about 18 to about 30 dl/g.

Once the dope is formed, it is then extruded to form a film. Generally, those extrusion techniques which are well known to those skilled in the art to extrude polymer melts are useful to extrude the solution of PBZT used in the present invention. In this regard, the dope may be either horizontally or vertically extruded. When vertically extruded, it is preferable that the dope be extruded through a tubular die into a solidifying bath, such as a water bath, containing nip rolls. When horizontally extruded, the dope may be extruded horizontally through a die without noticeable sag due to the stiffness of the PBZT dope. In particular, the dope may be extruded through a die and fed to horizontal nip rolls while water is sprayed on the extruded dope.

The extrusion operation is not rate sensitive. However, the rate of extrusion is a function of pressure, polymer molecular weight, solids, solvent concentration (e.g., polyphosphoric acid concentration), and temperature. Thus, these parameters should be balanced accordingly.

The draw ratio of the formed film, which is the ratio of the take up speed of the resulting film to the extrusion speed is about 1 to about 10, and preferably 1.5 to about 5. The draw ratio, however, should be balanced with the expansion ratio of the film to obtain a good balance of properties.

Extrusion of the dope is generally achieved at a temperature in the range of from about 10 to about 100%. The temperature of the dope at extrusion, which affects the viscosity of the dope, generally dictates the amount of pressure which is necessary to extrude the dope.

The extruded film preferably has a thickness of a fraction of a mil. However, thicknesses of up to several mils can be obtained.

For the extrusion of the dope, a variety of dies may be employed in the process, all of which are well known to those versed in the art. An illustrative die is exemplified in the FIGURE. This die (1) is a tubular die having an internal diameter of about 0.5 in. with a mandrel (2) having a diameter ranging from about 0.015 to about 0.030 smaller than the die, thus leaving a thin gap (7) to form a film. The mandrel is hollow to allow for the introduction of a gas through the gas inlet (3) to impinge upon the formed film for the expansion step. The dope is passed through dope inlet (4). A sprocket may be placed on mandrel shaft and connected to a variable motor to provide rotation of the mandrel (2). The dope is extruded as a film through film outlet (8).

Biaxial properties are generated in the film to improve transverse strength. Biaxial orientation can be carried out using a variety of methods. For example, the film may be expanded by techniques such as blowing, sheared by rotational forces, and cross stretching. Of these, expanding the film by blowing is the preferred method, particularly when it is desirable to produce a thinner film. That is, the film is subjected to treatment with a pressurized gas such as air or nitrogen to form a bubble-like structure from the film. Looking to the above-described illustrative tubular die structure of the FIGURE, for example, the gas such as air can be passed through the gas inlet (3) of hollow mandrel (2) thus subjecting the extruded film to the gas at the film outlet (8) whereby the bubble-like structure is formed. Furthermore, to improve centering and uniformity of the blown film, the mandrel may be rotated. If the mandrel is rotated, the rotational rate is not particularly critical and can be relatively long, e.g., 100 sec./rev. with slow extrusion rates. However, the speed of rotation should be controlled relative to the extrusion rate to avoid excessive twisting of the bubble-like structure which is formed.

The blow up ratio of the bubble, which is the ratio of the bubble diameter to the die diameter, is typically from about 1 to about 10, and preferably about 1.5 to about 6. The size of the bubble may be controlled by using a number of means. For example, the pressure of the expansion gas may be varied or the extrusion speed may be increased. Furthermore, the size and shape of the bubble may be controlled using mechanical means such as a forming ring.

As described above, biaxial properties may also be generated by imparting shear forces to the extruded film in more than one direction. This is usually more preferable to blowing when it is desirable to produce thicker films. The dope may be coated, for example, on rigid rods such as aluminum, stainless steel or acrylic rods, as they are pulled through the die. While the rod is pulled through the die it is also rotated to impart shear forces in a second direction to the film. For example, the rods can be pulled through the die at a rate of about 1.5 inch/minute and rotated at a rate of about 1 to about 4 revolutions per minute. Generally, however, the pull rate and rotation rate can be varied to obtain any spiral pattern which is desired, although a pattern of a 45° helix angle can be expected to be optimum.

A device for rod coating would utilize, for example, a mechanical pulling device including a screw, a sliding carriage, and two motors. The rod would be inserted through a die by hand and bolted to a double universal joint coupled to the screw to provide centering and prevent binding. One motor would be used to drive the carriage to provide pulling action for the rod while the other motor would be used to rotate the coated rod.

Once the film has been treated to impart transverse strength thereto, it is solidified. This solidification may be accomplished by contacting the film with a coagulant such as water, alcohols, etc. In this regard, such treatment with a liquid may be accomplished using a coagulation bath containing the liquid or alternatively, the liquid may be sprayed on the film. In addition, the film may be solidified by contacting it with a chilled gas such as air or nitrogen.

Since the PBZT used in the present invention is a solution, the film should be washed to remove the solvent. Substantial washing can be accomplished during the abovedescribed solidification step such as in the coagulation bath. Alternatively, the film can be washed in a separate washing step using a separate washing bath or by spraying using a suitable washing solution such as water. Although not necessary, it may be desirable to use a warm washing solution to obtain a better and faster washing.

If biaxial properties are provided by expanding the film using blowing techniques, to facilitate handling of the film after it has been expanded to form the bubble-like structure, the bubble may be collapsed using, for example, nip-rolls, a belt or other suitable means known in the art for film processing. Furthermore, the collapsed bubble may be cut at the edges thereof, using, for example, a slitter or it may be rolled up without cutting and cut later.

Following washing, the film may be dried. For example, the film may be subjected to a temperature in the range of from about 100° to about 200°, and preferably about 100° to about 150° C., for approximately 1 to 5 minutes. Drying can be accomplished by conventional means such as circulating air ovens and vacuum ovens. The formed film may be recovered by winding on a reel.

To improve the properties of the film, the film may be subjected to heat treatment by, for example, passing the film through an oven at a temperature in the range of about 375° to about 650°, and preferably about 500° to about 650° C. The heat treatment can be carried out from a few seconds to a few minutes, e.g., from about 30 to about 240 seconds. Optionally, the heat treatment may be carried out while subjecting the film to tension such as a stretch of from about 0.5 to about 6, and preferably about 1 to about 3% stretch. The heat treatment should also be performed in an inert atmosphere such as nitrogen. Film which has been subjected to such heat treatment exhibits a strength in the range of about 325 Ksi. and may have similar strength with about twice the modulus of a film which was not heat treated in this manner.

To obtain a more complete understanding of the present invention, the following Examples of preparing films of PBZT are set forth. It should be understood, however, that the invention is not limited to the specific details set forth therein.

EXAMPLE 1: VERTICAL EXTRUSION

1. Trial 1: Samples 1 and 2

A downward extrusion into a water bath containing a set of nip rolls was used for preparing a tubular film from PBZT dope. A tubular die was constructed with an internal diameter of 1.27 cm with a mandrel having a diameter 0.04 cm smaller, leaving a thin gap to form the film. Nitrogen was admitted to the hollow mandrel to blow the bubble. A sprocket was placed on the mandrel shaft and was connected to a variable speed motor to provide rotation. This was done to minimize variations in dope thickness and provide a more homogeneous film.

A PBZT polymerization mixture of polymer dissolved in polyphosphoric acid yielding a very viscous dope which essentially would not flow at room temperature, was obtained and the dope was packed by hand into pipe cylinders. A uniform void free dope was obtained after multiple passes through a vented extruder under vacuum. The behavior of the dope was observed as being similar to a normal molten polymer, not a solution.

For extrusion, the dope was fed from a cylinder of dope at about 100° C. by direct mechanical pressure to a gear type metering pump. A filter containing a fine sintered stainless steel media (Dynalloy X7) was placed before the pump to protect it from debris. From the pump, dope was fed directly to the die. All lines were traced with electrical heating tape to maintain dope temperature.

Extrusion was vertically downward into a coagulant bath of water. Beneath the water a set of driven nip rolls were placed. After collapse of the bubble by the nip rolls, the flattened tube exited the bath and was taken up on a bobbin interlayed with a polyester nonwoven. The film was washed free of acid by immersion in a flowing water bath for several days. After washing, samples were withdrawn, slit by hand and taped to polyethylene bottles to provide some constraint during air drying. The initial slitting of wet film was difficult due to the thinness of the film coupled with the transverse orientation which tended to lead the scissors diagonally. The film was subjected to several days of air drying followed by overnight drying in a circulating air oven at 60°–80° C.

The availability of higher molecular weight dope (35 IV) made blowing of a tube much easier since the dope solution was much stronger than lower molecular weight dope. For that matter, it could be stretched by hand like bubble gum and resembled bubble gum in many ways. Samples of blown film over 10 cm in diameter resembling balloons were produced.

The dope temperature was 74° C. requiring about 8.3 MPa (1200 psi) of pressure for extrusion at rates of 0.05 to 0.1 m/minute. A long air gap above the bath of about 30 cm was used with a depth to the nip rolls of 13 cm in the 8° C. water coagulant bath. Roll speed was maintained at 0.55 m/minute which gave a substantial film residence time, both in the air gap as well as the coagulant bath. The film width after flattening and exiting the coagulant bath was 3.0 cm for Sample 1 and 5.0 cm for Sample 2 due to different blow-up ratios. The bubble diameters of Samples 1 and 2 before coagulation were estimated to be 3.0 and 4.5 cm, respectively.

A thicker streak tended to form on one side of the film. Rotation of the internal mandrel in the die tended to improve centering and produced somewhat more uniform film. However, it did not eliminate thicker areas. "Vein" like patterns were commonly found on the bubble surface. These represent inhomogeneities intrinsic to the dope. Mandrel rotation produced a spiral orientation to those veins. Too much rotation caused the film to twist itself closed, much the way a balloon can be made from bubble gum. Overrotation for the effective dope viscosity was recognized by the bubble tending to turn inward, rather than outward. A rotational speed of 1.8 rpm or 33 sec/revolution was used for this trial. The resulting spiral dope pattern was evident in the bubble.

The results from two different combinations of extrusion draw ratios and blow up ratios are shown in Table 1. Sample 1, which was stretched less in the cross machine direction than Sample 2, was expected to possess greater machine direction properties and poorer cross machine properties. Both of these samples were wide enough so that testing could be done using the same gauge length of 1.27 cm so as to directly compare the results. As expected, Sample 2 showed the highest cross machine properties namely, about 10% of the longitudinal strength and modulus. Transverse elongations were greater than those in the machine direction. Longer gauge length testing, to reduce the effect of machine compliance, show both films to have similar moduli of about 100 GPa (14 Msi).

Due to the inaccuracies in measurement of the thickness of the film, which is the order of 3–9 micrometers, all testing was done in fiber type units of denier (the weight of 9000 m of sample). This was then multiplied by 12800 times the sample density which was found to be 1.54 g/cm$^3$ using a non-aqueous gradient density column.

TABLE 1

| BLOWN FILM - 35 I.V. | | |
|---|---|---|
| | Sample 1[1] | Sample 2[1] |
| Extrusion Draw Ratio | 11 | 5.5 |
| Blow-Up Ratio | 2.4 | 3.5 |
| Properties[2] | | |
| Machine Direction 1.27 cm Gauge | | |
| Strength, GPa (ksi) | 1.2 (170) | 1.0 (150) |
| Elongation, % | 2.2 | 4.1 |
| Modulus, GPa (Msi) | 60 | 37 (5.4) |
| Cross Machine Direction 1.27 cm Gauge | | |
| Strength, GPa (ksi) | 0.08 (12) | 0.11 (16) |
| Elongation, % | 5.0 | 5.7 |
| Modulus, GPa (Msi) | 2.3 (0.34) | 3.4 (0.49) |
| Ratio MD:XMD | | |
| Strength, GPa (ksi) | 14:1 | 9:1 |
| Elongation % | 0.44:1 | 0.72:1 |
| Modulus, GPa (Msi) | 26:1 | 11:1 |
| Machine Direction 2.54 cm Gauge | | |
| Strength, GPa (ksi) | 1.0 (140) | 1.1 (150) |
| Elongation, % | 1.6 | 2.4 |
| Modulus, GPa (Msi) | 77 (11) | 69 (9.9) |
| Machine Direction 12.7 cm Gauge | | |
| Strength, GPa (ksi) | 1.0 (140) | 1.1 (150) |
| Elongation, % | 0.86 | 1.1 |
| Modulus, GPa (Msi) | 100 (14) | 96 (14) |

[1]PBZT dope 5103-28, 13.8% solids, 35 IV, Die 74° C.
[2]Calculated from a density of 1.54 g/cm$^3$

2. TRIAL 2: SAMPLE 3

Prior to the next extrusion trial, a slitter was constructed and reels were provided to take up the scrap film edges. Knife blades cemented to a block of aluminum riding on a roll were used to produce a fixed width cutter. For this trial, a deep immersion of the tube was used, 31 cm, with a 20 cm air gap. Line speed was 0.5 m/min and the film stretch ratio was 10. At a dope temperature of 83° C., extrusion pressures were low, i.e., 2 MPa (300 psi). Because of problems of twisting off of the tube, die rotation was slowed to one revolution per minute. Residence time in the coagulant bath was 1.1 minutes. The film was batch washed in a tank.

Maintaining a stable bubble was difficult as the diameter tended to fluctuate, possibly due to extrudate thickness and dope temperature variations. This caused the bubble to expand easier in some areas than others. When the resultant nonuniform bubble was collapsed by the nip rolls in the bottom of the coagulant bath, the resulting surge of internal air pressure generated an even more nonuniform bubble. As a result, there was catastrophic failure of the bubble. However, the 2.5 cm wide cutter functioned well.

In normal melt blown film extrusion, size uniformity is maintained by the use of an external chill ring which locates the solidification area, keeps it close to the ring, and thus determines diameter. As a variation of this, a ring was constructed from a piece of PVC pipe with a 5-cm inside diameter and placed just beneath the water level to confine and guide the bubble. The bottom of the 25-cm long pipe was flattened to collapse the bubble and guide it into the nip rolls. A short air gap of 10 cm was used between the die and the water bath. An extrusion rate of 0.1 m/minute was used, which with a line speed of 0.5 m/min, gave an extrusion stretch ratio of 5, while the forming ring diameter fixed the bubble blow up ratio at 4.

Preliminary trials with this forming ring demonstrated the tremendous strength of high I.V. PBZT dope. Even when the bubble was too large to fit into the ring, it was compressed and pulled through without breaking. The only breaks which occurred were caused by blowing the bubble too large.

These trials were performed using a deep coagulant bath to provide substantial film coagulation prior to squeezing in the nip rolls. After removal of the forming ring, the nip rolls were raised closer to the water surface, i.e., within 14 cm. Bubble stability (cycling) was found to be substantially improved. Although the coagulation time prior to the nip rolls was reduced, the inner walls of the flattened tube did not stick together, thus allowing for easy separation of the samples.

Extrusion conditions similar to the previous trial were used. Dope temperature was 83° C. and die pressure climbed to 8.3 MPa. A one rpm mandrel rotation was used with an extrusion rate of 0.05 m/min. The line speed was lowered slightly to 0.39 m/min which still provided a bath residence time of 1.1 minutes with an extrusion stretch ratio of 7.6.

A bubble was blown which was 5.6 cm in diameter giving a blow up ratio of 4.4. The theoretical layflat of this would be 8.8 cm, however, after exiting the bath a layflat of only 7.0 cm was observed. This represents a shrinkage of 20%, a reasonable value based on previous experience. Later, when the system stabilized, the film width was 6.3 cm. After cutting 2.5 cm wide, the two layers were not separated but were washed together. This was later found to be a problem since the samples tended to stick together.

When the film is passed into the water and then into the nip rolls which flattened it, the bubble is collapsed back toward the die. Flat coagulated film then exits the bath over a roll and is picked up on a carrier belt of Hollytex 3242, a polyester nonwoven. In some instances wrinkles and folds were evident on the film surface. The Hollytex 3242 nonwoven with the film on it was then passed over a knife slitter, and the resulting double thick film was either wound on a reel or on two separate reels while the edge scraps were collected separately.

After washing and drying, the full width film was tested. Machine direction properties are shown in Table 2 assuming a density of 1.50 g/cm³. The narrow width of the film precluded any measurement of transverse properties.

TABLE 2

| PROPERTIES OF NARROW FILM | |
|---|---|
| | Sample 3[1] |
| Extrusion Draw Ratio | 10 |
| Properties[2] | |
| Machine Direction 2.54 cm Gauge | |
| Strength, GPa (ksi) | 0.98 (140) |
| Elongation, % | 2.8 |
| Modulus, GPa (Msi) | 43 (6.2) |
| Machine Direction 12.7 cm Gauge | |
| Strength, GPa (ksi) | 0.57 (80) |
| Elongation, % | 1.1 |
| Modulus, GPa (Msi) | 62 (8.9) |

[1]PBZT dope 5103-28, 13.8% solids, 35 IV, die 83° C.
[2]Calculated from a density of 1.5 g/cm³

3. TRIAL 3: SAMPLES 4 and 5

For the following trial, a substantially long distance was used between the extrusion die and the water bath with the nip rolls placed very shallow in the water. In addition, a set of rolls was placed above the water to flatten the bubble and guide it to the nip rolls. Rubber belts were placed on these rolls to control bubble flattening. The die to water distance was 51 cm (20 in) which, with a line speed of 1.06 m/min, gave a 28 second residence time for the tube before coagulation. Guide rolls were placed about 28 cm above the bath with a 7.6 cm spacing producing some flattening to the 95 cm diameter bubble. Based on die diameter, a blow up of 7.5 was obtained. Die temperature was 92° C. with a pressure of 5.4 MPa (780 psi). Take up paper slit 16 cm wide was fed through the nip located about 215 cm beneath the water surface and exited with a 15 cm wide coagulated and flattened PBZT tubular film. The adjustable slitting knives then slit the edges leaving an 8.7 cm wide double film which was separated and taken up on two bobbins.

Layflat varied during the trial which is the reason for the narrow slit band, 8.7 cm being sufficiently wide to test transverse strength. Unslit film width varied from 11.8–12.2 cm. No mandrel rotation was used.

A second sample (Sample 5) was made blowing the bubble somewhat larger to give a 14–14.5 cm wide film. Slow mandrel rotation was used but with no noticeable improvements in film appearance, although appearance was better than earlier samples. These film samples were washed in flowing water for several days and were then allowed to air dry. Despite this washing, residual phosphorous levels of about 0.5% were found.

There was great difficulty in cutting samples with clean edges suitable for physical testing. Thus, the results shown in Table 3 were quite variable and as a result, are the best obtained values, rather than average values. The results in Table 3 do not correlate well with extrusion conditions, although they are not outside the limits of variability. The first sample, Sample 4, has a high degree of transverse properties whereas the second sample, Sample 5, which should have had greater transverse strength due to greater blow up, actually had less transverse and greater machine direction strength. Of course, the transverse strength may have been low due to sample and test problems and the high longitudinal strength was reasonable from the higher overall stretch. Nevertheless very respectable transverse strengths were obtained. Longer gauge testing did give somewhat higher moduli and lower elongation values as expected by reduction of machine compliance.

TABLE 3

| PROPERTIES OF BLOWN FILM | | |
|---|---|---|
| | Sample 4[1] | Sample 5[1] |
| Extrusion Draw Ratio | 4.7 | 4.7 |
| Blow-Up Ratio | 7.5 | 8.7 |
| Properties | | |
| Machine Direction 2.5 cm Gauge | | |
| Strength, GPa (ksi) | 0.72 (105) | 1.2 (170) |
| Elongation, % | 14.0 | 13.9 |
| Modulus, GPa (Msi) | 12 (1.7) | 32 (4.6) |
| Cross Machine Direction 2.5 cm Gauge | | |
| Strength, GPa (ksi) | 0.51 (70) | 0.33 (50) |
| Elongation, % | 5.7 | 6.7 |
| Modulus, GPa (Msi) | 11 (1.6) | 8.1 (1.2) |
| Ratio MD:XMD | | |
| Strength | 1.4 | 3.6 |
| Elongation | 2.5 | 2.1 |
| Modulus | 1.1 | 3.9 |

TABLE 3-continued

| PROPERTIES OF BLOWN FILM | | |
|---|---|---|
| | Sample 4[1] | Sample 5[1] |
| Machine Direction 12.7 cm Gauge | | |
| Strength, GPa (ksi) | 0.40 (60) | 0.71 (100) |
| Elongation, % | 3.9 | 2.3 |
| Modulus, GPa (Msi) | 18 (2.7) | 46 (6.7) |

[1]PBT dope, 27 IV, 13.7% solids, die 70° C.

EXAMPLE 2: HORIZONTAL EXTRUSION

TRIAL 1:

As discussed above, due to the incredible stiffness of PBZT dope, it is possible to extrude a tube horizontally without noticeable sag. Water can then be sprayed on the tube to coagulate it. This allows the distance before coagulation to be varied. For the first trial, a set of horizontal nip rolls were placed about 2 meters away from the die face. A 10 cm length of copper tubing was perforated with holes and connected to water to "rain" on the tube for coagulation. A tube was extruded nominally 4 cm in diameter but there were larger and smaller areas. One sample was removed from the nip rolls and allowed to extrude as a tube across the room (5–6 m).

It was determined that an external forming ring might allow the tube to expand to a limit in a more controlled fashion than occurred with the vertical die extrusion exemplified above. To provide coagulation when the tube reached the size of the ring, the ring was slotted and water was sprayed on it. Tube expansion to meet the 3.5 cm diameter forming ring (2.8 blow up ratio) was easily achieved.

Positioning the forming tube about 5 cm from the die face allowed easy bubble blowing and prevented the coagulating water from running against the die face. Spray tubes about 0.5 meters in length were used to increase washing times. Some tubes were extruded without flattening the tube, but just attached to a pull wire. Samples were also made without the forming ring. Fairly uniform tubes were made after conditions stabilized. Shrinkage during washing created a wrinkled surface.

Mandrel rotation was attempted to eliminate streaks in the tubes. The chain drive used for rotation exerted sufficient side thrust to produce a constant deflection. Mandrel rotation, however, did produce sufficient transverse orientation of the tube to give significant transverse strength.

TRIAL 2:

A 2.54-cm circular blown film die was used for the trial. The mandrel of this die did not rotate. The exit ring, which was outward diverging, was adjustable to give a uniform extrudate thickness. This improved design did not translate into tubes of improved quality, at least from the limited trials conducted. Nonetheless, one long tube was "inflated" with a water hose on the floor and was subsequently washed with water. Portions filled with water were hung on the wall and over a period of days the water slowly oozed through the film and collected on the outside. Such a tube may have membrane applications.

TRIAL 3:

A length of tube was extruded from the original die (12.7 mm diameter by 0.30 mm thick) without blowing. It was coagulated by spraying with water forming a tube which looked like a piece of half inch copper tubing. Rigidity was sufficient so that supports were only required about one meter apart. After making 3–4 m of this tube, it was laid on the floor and washed over several days by flowing water through it. After washing, the size of the tube had been reduced to resemble a piece of quarter inch copper tubing. Air drying gave further shrinkage to about 3 mm in diameter with some twisting and a rather "woody" appearing surface. Spiral lines were visible on the inner and outer surfaces. Intentional lengthwise splitting was difficult with many fibrils bridging the gap.

EXAMPLE 3: HEAT TREATMENT

As discussed above, heat treatment of PBZT under tension will significantly increase the property levels, particularly the modulus. For heat treatment, the dried film was tensioned by passing over a set of six rubber covered rolls, then through a static air oven to remove any remaining moisture, through the heat treat oven blanketed with flowing nitrogen, and finally over another six roll stack of tensioning rolls. Interlay paper was used for cushioning on take-up. Dryer and oven were the same length with a nominal residence time of 2 minutes each. Oven temperatures were about 200° C. with a heat treatment temperature of 525° C. A common problem with films thicker than about 10 micrometers was bubbling or delamination of the layers giving an opaque appearance and expanding the thickness. This phenomena is believed to be caused by traces of volatiles and may occur in the drying oven if it is too hot, or in the heat treatment oven. Vacuum oven drying of the bulk film beforehand coupled with careful staging of the heating cycles and a thin film was found to minimize the problem.

Greater amounts of stretch should increase property levels but at a higher risk of film failure. At higher temperatures, the allowable stretch decreases.

Dried, as-extruded film tended to show wrinkles on a 7.5 cm diameter package. However, after heat treatment, the film becomes stiff enough so that it does not bend significantly and, in fact, kinks develop thus resembling a type of lozenge pattern.

The first sample to be heat treated was the 2.54-cm wide slit film produced in Example 1, the properties of which are listed in Table 2. While only small increases in strength were obtained as shown in Table 4, the modulus doubled as compared with the precursor. Film width decreased from 18 mm on the first roll, to 16 mm after the oven, to 14 mm after heat treatment. Values like this are normal consequence of the applied tension. Overall, the properties are excellent.

Next, an unslit tube sample was heat treated. However, the two layers were found to be stuck together somewhat after heat treatment. This led to abandonment of trials to heat treat entire tubes.

Heat treatment of the precursors shown in Table 3 was performed at both 525° and 650° C. After air drying, precursor film was oven dried at 80° C. overnight before heat treatment to eliminate as much moisture as possible. A 2 minute residence time at 200° C. in the predrier with a 2 minute residence time in the oven at 525° C. was used. Stretch levels of 2.1 and 4.1% were attempted, but the 4.1% sample did not run stably. At 650° C. the stretch level had to be reduced to 1.1% to prevent breakage. Properties of these heat treated films are shown in Table 5.

TABLE 4

HEAT TREATMENT OF NARROW FILM

|  | Sample 6[1] | Sample 7[1] |
|---|---|---|
| Temperature (°C.) | 525 | 525 |
| Stretch (%) | 1.5 | 2.1 |
| Properties | | |
| Machine Direction 2.5 cm Gauge | | |
| Strength GPa (Ksi) | 1.2 (180) | 1.0 (150) |
| Elongation (%) | 1.6 | 1.3 |
| Modulus GPa (Msi) | 89 (13) | 86 (13) |
| Machine Direction 12.7 cm Gauge | | |
| Strength GPa (ksi) | 0.88 (130) | 1.0 (150) |
| Elongation (%) | 0.71 | 0.62 |
| Modulus GPa (Msi) | 130 (19) | 170 (24) |

[1]As extruded machine direction properties; strength/elongation/modulus at 2.5 cm gauge: 0.98 GPa/2.8%/43 GPa

TABLE 5

HEAT TREATMENT OF BIAXIAL FILM

|  | Sample 8[1] | Sample 9[1] | Sample 10[2] | Sample 11[2] | Sample 12[3] | Sample 13[2] |
|---|---|---|---|---|---|---|
| Temperature (°C.) | 525 | 525 | 525 | 525 | 525 | 650 |
| Stretch (%) | 2.1 | 4.1 | 2.1 | 2.1 | 2.1 | 1.1 |
| Properties | | | | | | |
| Machine Direction 2.5 cm Gauge | | | | | | |
| Stretch GPa (Ksi) | 0.82 (120) | 1.0 (140) | 1.7 (250) | 0.71 (100) | 1.10 (160) | 0.51 (75) |
| Elongation (%) | 3.24 | 1.8 | 4.4 | 0.83 | 2.7 | 1.3 |
| Modulus GPa (Msi) | 40 (5.8) | 59 (8.6) | 80 (12) | 86 (13) | 56 (8.1) | 40 (5.9) |
| Cross Machine Direction 2.5 cm Gauge | | | | | | |
| Strength GPa (Ksi) | 0.22 (32) | 0.28 (41) | 0.15 (22) | 0.16 (24) | 0.14 (20) | 0.06 (8.6) |
| Elongation (%) | 3.8 | 8.7 | 7.1 | 3.6 | 6.9 | 0.90 |
| Modulus GPa (Msi) | 8.0 (1.2) | 6.3 (0.92) | 2.7 (0.40) | 5.0 (0.72) | 2.0 (0.29) | 6.5 (0.94) |
| Ratio MD:XMD | | | | | | |
| Strength | 3.7 | 3.6 | 113 | 4.4 | 7.9 | 8.5 |
| Elongation | 0.84 | 0.21 | 0.62 | 0.23 | 0.39 | 1.4 |
| Modulus | 5 | 9.4 | 30 | 17 | 27 | 6.2 |
| Machine Direction 12.7 cm Gauge | | | | | | |
| Strength GPa (Ksi) | 0.49 (71) | — | 0.25 (36) | 0.42 (61) | 1.9 (280) | 0.17 (25) |
| Elongation (%) | 0.58 | — | 0.44 | 0.79 | 2.2 | 0.22 |
| Modulus GPa (Msi) | 85 (12) | — | 57 (8.2) | 54 (7.8) | 130 (19) | 78 (11) |

[1]Film from Sample 4: As extruded machine direction properties, strength/elongation/modulus at 2.5 cm gauge/0.72 GPa/14%/12 GPa
[2]Film from Sample 5: As extruded machine direction properties, strength/elongation modulus at 2.5 cm gauge/1.2 GPa/14%/32 GPa
[3]From PBT dope having 16.8% solids, 24 IV, die 70° C.: As extruded machine direction properties, strength/elongation modulus at 2.5 cm gauge/215 Ksi/2.3%/13.4 Msi From a review of Samples 8 and 9 it can be seen that the 4.1% stretch level did increase tensile strength and modulus compared with the lesser stretched sample. For both these samples, the strength increase obtained from heat treatment was moderate but the modulus increase was large. The next two samples, Samples 10 and 11 should have been identical. The second was prepared because the first one broke. The high strength of Sample 10 suggests that it may well have been strained more than the other which would account for the breakdown. The transverse properties were low, probably due to the difficulty in sampling and testing.

As can be seen from the results of Sample 13, heat treatment of 650° C. did not translate into a significant improvement over the lower temperatures used in this trial. The film was also significantly darker in color. Operability was also poorer at the higher temperature.

Sample 12 exhibited excellent properties when tested at the longer gauge length. This level of machine direction properties, a tensile strength of 1.9 GPa (280 ksi), 2.2% elongation and a modulus of 130 Gpa (19 Msi) coupled with handleable transverse properties and a density of less than 1.5 g/cm3 shows this to be an excellent material.

EXAMPLE 4: ROD COATING

One way to produce a more uniform tube is to use an internal support. The support may be one which can be deformed to accommodate shrinkage, or a rigid core which can be put into compression by the shrinkage forces. Since the latter is much easier to accomplish, this was the approach tested.

Pieces of aluminum tubing or stainless steel rod were polished so that they would fit through the mandrel bearing of a die in place of the mandrel (0.95 cm diameter). The die was then used to deposit a 1.6 mm (1/16") thick coating of dope upon the rods as they were pulled through. Coagulation was accomplished with a water spray. Samples were than batch washed in a tank.

The initial aluminum rod was pulled through the die using a wire wound on a drum. However, defects such as skips and thicker areas occurred. A dark colored vein was visible on the back where the dope flows rejoined after flowing around the rod. Even at a rate of 2.7 cm/minute, the pulling force was enough so that a support had to be inserted between the die and the take-up.

The second rod was a solid stainless rod which was coated with silicone oil to prevent bonding of the dope to the rod and thus possibly allowing subsequent removal of the rod. The oil prevented bonding since the rod could be pulled out of the dope. Unfortunately, uniform feed became impossible. A corrugated surface was produced as the dope alternately built up at the exit and then blew away when the pressure became too high.

To provide a uniform feed rate for coating rods with PBZT dope, a mechanical pulling device was then constructed using a screw, sliding carriage and two motors. The rod was inserted through the die by hand and was bolted to a double universal joint coupled to the screw to provide centering and prevent binding.

One motor drove the carriage at a maximum speed of 4 cm/min to provide the pulling action for the rod while the other was used to rotate the rod to impart spiral orientation to the coating. Several one-meter lengths of thin wall aluminum tubing and solid acrylic of 0.96 cm (0.375 in) diameter were obtained which were sanded to roughen the surface and allow them to fit freely through the bushing in the circular die.

The 35 I.V. dope was degassed and homogenized with multiple passes through the extruder. The dope was then fed to the die at 102° C. Overfeeding of the die was done with dope pressures of 3.4 MPa (500 psi) and a linear rod speed of 4.2 cm/minute.

The first two samples were coated without coagulation. That is, the fully coated rods were subsequently coagulated in a water bath. Of course, overfeeding produced dope swell at the die exit but this was done intentionally to prevent voids, produce sufficient back pressure to center the tube, and to create a good "weld" line on the backside. With the first sample, air bubbles were found at the weld line. The one-sided die feed continued to produce a thicker area from uneven pressure distribution and clearance around the tube. Upon coagulation and drying, this uneven mass caused the rod to bend. The second tube stuck in the bushing and had the same defects.

After cleaning, a third rod was coated giving similar defects, namely, a thick stripe down the side, a weak weld line with splits at the beginning, and some bubbles. Water was sprayed on the tube to begin coagulation 10.5 cm from the die face or about 2.5 minutes after extrusion. Next, a solid acrylic rod was coated. A plastic shield prevented water splashing on the die face.

Coating of the acrylic rod was identical to the aluminum rods. The modulus of acrylic was lower, however, so that the thicker rib on the side caused the rod to severely bend upon coagulation. A slightly closer coagulant spray was used (9 cm), or about 2.2 minutes after extrusion. This was as close to the die as was practical to prevent water flowing back to the die face. To improve uniformity, a second acrylic rod was coated while rotating the rod at 1 rpm. The thick rib still existed, however, but it spiralled around the rod with a period of about 4 cm (the linear velocity was 3.9 cm/min). When the rod was about two-thirds coated, the linear pulling rate was cut in half, thus reducing the spiral period to about 2 cm and doubling the dope thickness since the dope feed rate was not changed. After several revolutions under these conditions with excessive dope feed and a heavy rib, conditions were restored to the originals. Upon washing and drying, this coated rod remained straight. The thick areas from the low linear rate cracked from shrinkage, exposing oriented fibrils across the break.

Three additional aluminum rods were then coated. The first was coated at a slightly slower rate to deposit a thicker coating in an attempt to eliminate the weld line. This sample was overfed by a factor of 4 vs. 1.2 for the previous samples, yet evidence of a weld line remained. During the next sample, the linear speed was increased to the original setting since the dope was overfeeding so much that it appeared wavy. A final sample was made with a very slow rotation of 6 minutes per revolution giving a period of 23.1 cm. All of these rods were washed free of acid by immersion in a flowing water bath for several days and were then allowed to air dry.

The rationale behind using aluminum or acrylic tubes is that they could be dissolved without harming the PBZT tube.

Although the invention has been described with preferred embodiments, it is to be understood that variations and modifications may be used as will be appreciated by those skilled in the art. Such variations are to be considered within the scope of the following claims.

We claim:

1. A process for preparing a biaxially oriented film of a rigid rod heterocyclic liquid crystalline polymer comprising,
   (i) providing a dope from a polymerization mixture of a rigid rod heterocyclic liquid crystalline polymer and a solvent;
   (ii) extruding the dope to form a film;
   (iii) imparting biaxial orientation to the film to increase the transverse strength thereof;
   (iv) solidifying the biaxially oriented film; and
   (v) washing the solidified film to remove the solvent.

2. A process according to claim 1 wherein the rigid rod heterocyclic liquid crystalline polymer comprises a member selected from the group consisting of poly{(-benzo(1,2-d:4,5-d')bisthiazole2,6-diyl) 1,4-phenylene}, its cis isomer and mixtures thereof.

3. A process according to claim 1 wherein the rigid rod heterocyclic liquid crystalline polymer comprises a member selected from the group consisting of poly{(-benzo(1,2-d:4,5-d')bisoxazole-2,6-diyl) 1,4-phenylene}, its cis isomer and mixtures thereof.

4. A process according to claim 1 wherein the rigid rod heterocyclic liquid crystalline polymer comprises a member selected from the group consisting of poly{(-benzo(1,2-d:4,5-d')bisthiazole2,6-diyl) 1,4-phenylene}, its cis isomer and mixtures thereof.

5. A process according to claim 4 wherein the dope is vertically extruded.

6. A process according to claim 5 wherein the dope is extruded downwardly through a tubular die, expanded by blowing, and solidified in a coagulant bath including water.

7. A process according to claim 4 wherein the dope is horizontally extruded.

8. A process according to claim 7 wherein the dope is extruded horizontally through a die to form a tube of the film, said film is expanded by blowing and solidified by water spraying.

9. A process according to claim 4 wherein the extruded dope is coated on an internal support to form a film and said internal support is rotated to biaxially orient the film.

10. A process according to claim 9 wherein the internal support is a deformable support.

11. A process according to claim 9 further comprising, (vi) separating the internal support from the solidified film.

12. A process according to claim 1 further comprising, (vi) drying the washed film; and
   (vii) heat treating the dried film to further enhance the overall strength of the film.

13. A process according to claim 4 further comprising, (vi) drying the washed film; and
   (vii) heat treating the dried film to further enhance the overall strength of the film.

14. A process according to claim 13 wherein the heat treatment is carried out at a temperature of about 375° to about 650° C.

15. A process according to claim 14 wherein the heat treatment is carried out at a temperature of about 500° to about 650° C.

16. A process according to claim 13 wherein the film is heat treated under tension.

17. A polymer film layer produced by the process of claim 1.

18. A process for preparing a biaxially oriented liquid crystal polymer film or poly{(benzo(1,2-d:4,5-d')bisthiazole2,6-diyl) 1,4-phenylene}, its cis isomer or mixtures thereof comprising,
- (i) providing a dope from a polymerization mixture of a solution comprising a member selected from the group consisting of poly{(benzo(1,2-d:4,5-d') bis-thiazole-2,6-diyl) 1,4-phenylene}, its cis isomer and mixtures thereof, and polyphosphoric acid;
- (ii) extruding the dope through a tubular die to form a film;
- (iii) expanding the film by blowing to impart transverse strength thereto;
- (iv) solidifying the expanded film; and
- (v) washing the solidified film to remove the solvent.

19. A process according to claim 18 further comprising,
- (vi) drying the washed film; and
- (vii) heat treating the dried film to further enhance the overall strength of the film.

20. A polymer film layer produced by the process of claim 18.

21. A polymer film produced by the process of claim 19.

22. A process for preparing a biaxially oriented liquid crystal polymer film of poly{(benzo(1,2-d:4,5-d')bisoxazole-2,6-diyl) 1,4-phenylene}, its cis isomer or mixtures thereof comprising,
- (i) providing a dope from a polymerization mixture of a solution comprising a member selected from the group consisting of poly{(benzo(1,2-d:4,5-d') bisoxazole-2,6-diyl) 1,4-phenylene}), its cis isomer and mixtures thereof, and a solvent;
- (ii) extruding the dope through a tubular die to form a film.
- (iii) expanding the film by blowing to impart transverse strength thereto;
- (iv) solidifying the expanded film; and
- (v) washing the solidified film to remove the solvent.

23. A process according to claim 22 further comprising,
- (vi) drying out washed film; and
- (vii) heat treating the dried film to further enhance the overall strength of the film.

24. A polymer film layer produced by the process of claim 22.

25. A polymer film layer produced by the process of claim 23.

26. A process according to claim 9 wherein the internal support is a rigid rod support.

* * * * *